(No Model.) 8 Sheets—Sheet 1.

A. MERTES.
GEAR CUTTING MACHINE.

No. 553,037. Patented Jan. 14, 1896.

WITNESSES
O. M. Clarke
H. M. Corwin

INVENTOR
August Mertes
by W. Bakewell Sons
his Attorneys (No Model.) 8 Sheets—Sheet 2.

A. MERTES.
GEAR CUTTING MACHINE.

No. 553,037. Patented Jan. 14, 1896.

WITNESSES
INVENTOR (No Model.) 8 Sheets—Sheet 3.

A. MERTES.
GEAR CUTTING MACHINE.

No. 553,037. Patented Jan. 14, 1896.

WITNESSES
INVENTOR

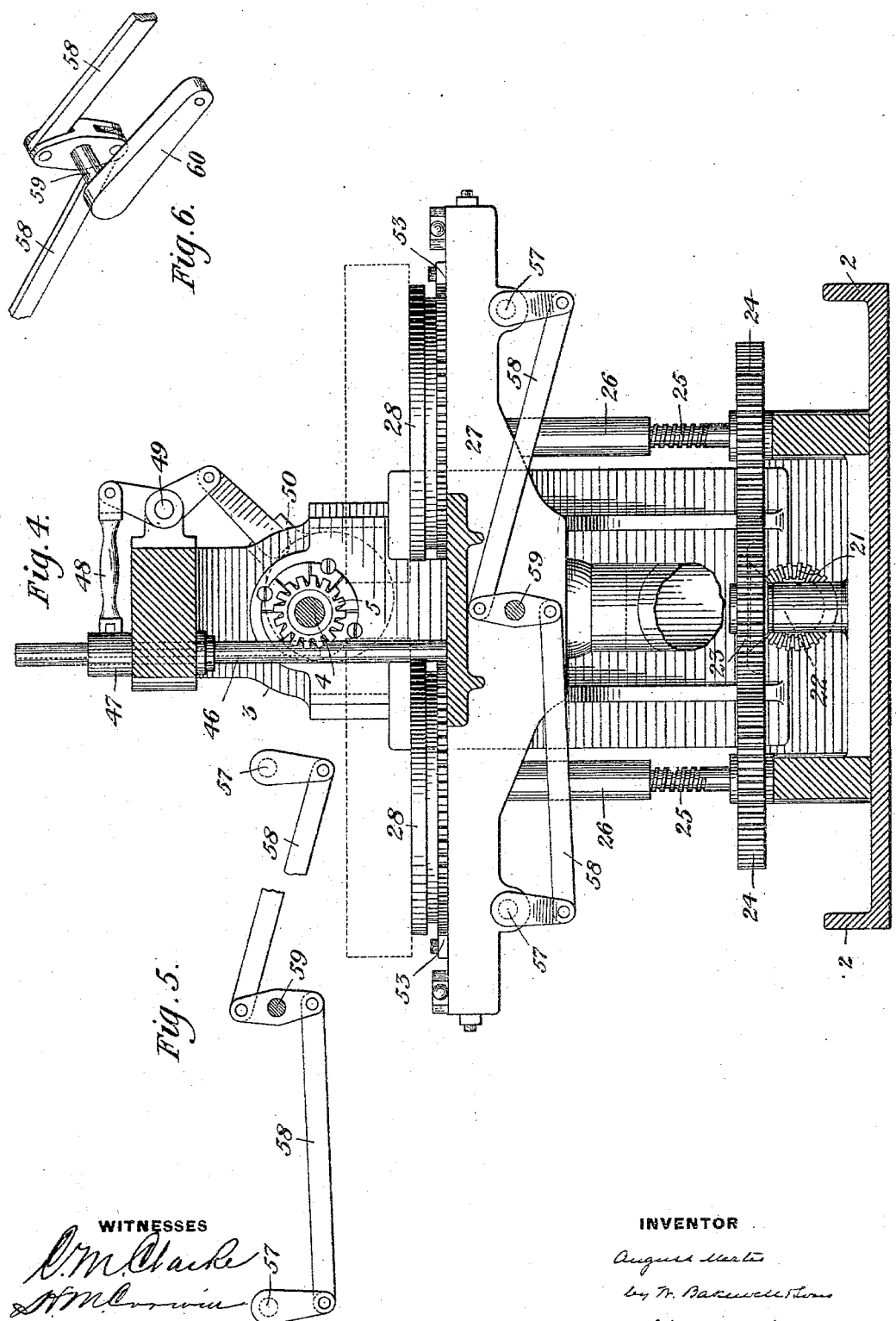

(No Model.) 8 Sheets—Sheet 5.
A. MERTES.
GEAR CUTTING MACHINE.
No. 553,037. Patented Jan. 14, 1896.
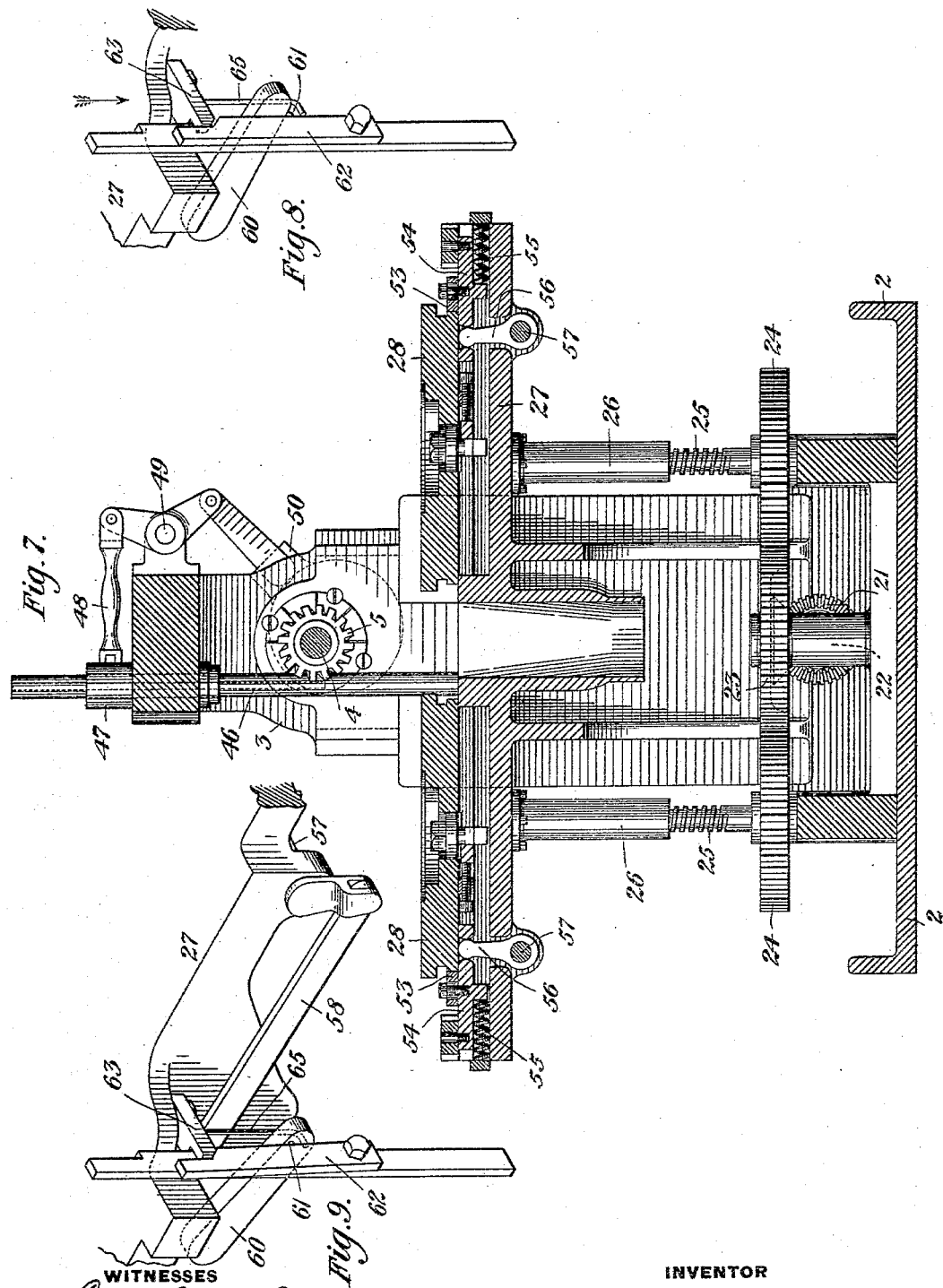
WITNESSES
INVENTOR (No Model.) 8 Sheets—Sheet 6.

A. MERTES.
GEAR CUTTING MACHINE.

No. 553,037. Patented Jan. 14, 1896.

WITNESSES
O. M. Clarke
H. M. Corwin

INVENTOR
August Mertes
by W. Bakewell & Sons
his attorneys (No Model.) 8 Sheets—Sheet 7.

A. MERTES.
GEAR CUTTING MACHINE.

No. 553,037. Patented Jan. 14, 1896.

WITNESSES

INVENTOR (No Model.) 8 Sheets—Sheet 8.

A. MERTES.
GEAR CUTTING MACHINE.

No. 553,037. Patented Jan. 14, 1896.

UNITED STATES PATENT OFFICE.

AUGUST MERTES, OF ALLEGHENY, PENNSYLVANIA, ASSIGNOR TO A. MERTES MANUFACTURING CO., OF SAME PLACE.

GEAR-CUTTING MACHINE.

SPECIFICATION forming part of Letters Patent No. 553,037, dated January 14, 1896.

Application filed January 19, 1895. Serial No. 535,483. (No model.)

*To all whom it may concern:*

Be it known that I, AUGUST MERTES, of Allegheny, in the county of Allegheny and State of Pennsylvania, have invented a new and useful Improvement in Gear-Cutting Machines, of which the following is a full, clear, and exact description, reference being had to the accompanying drawings, forming part of this specification, in which—

Figure 1:
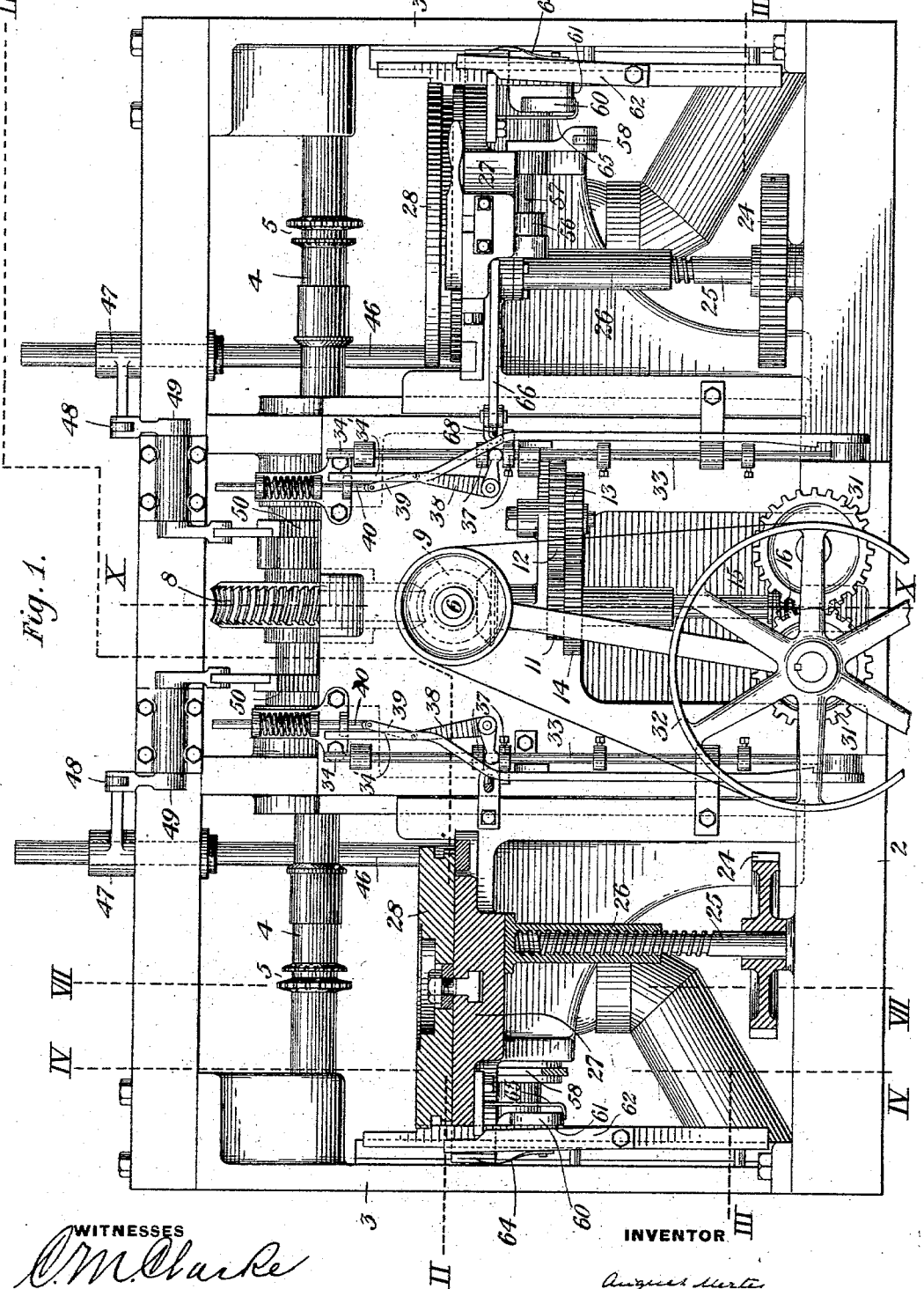
Figure 2:
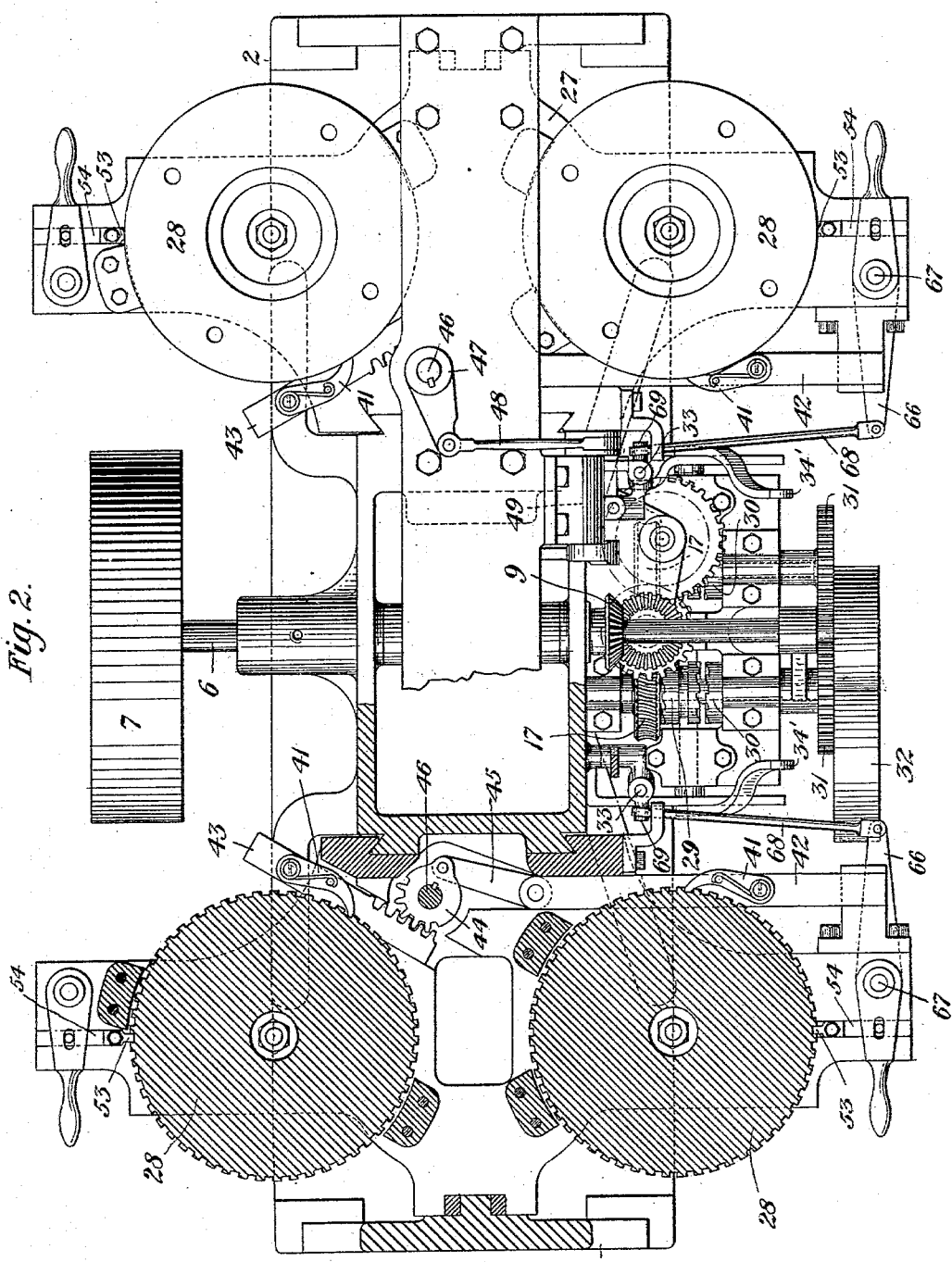
Figure 3:
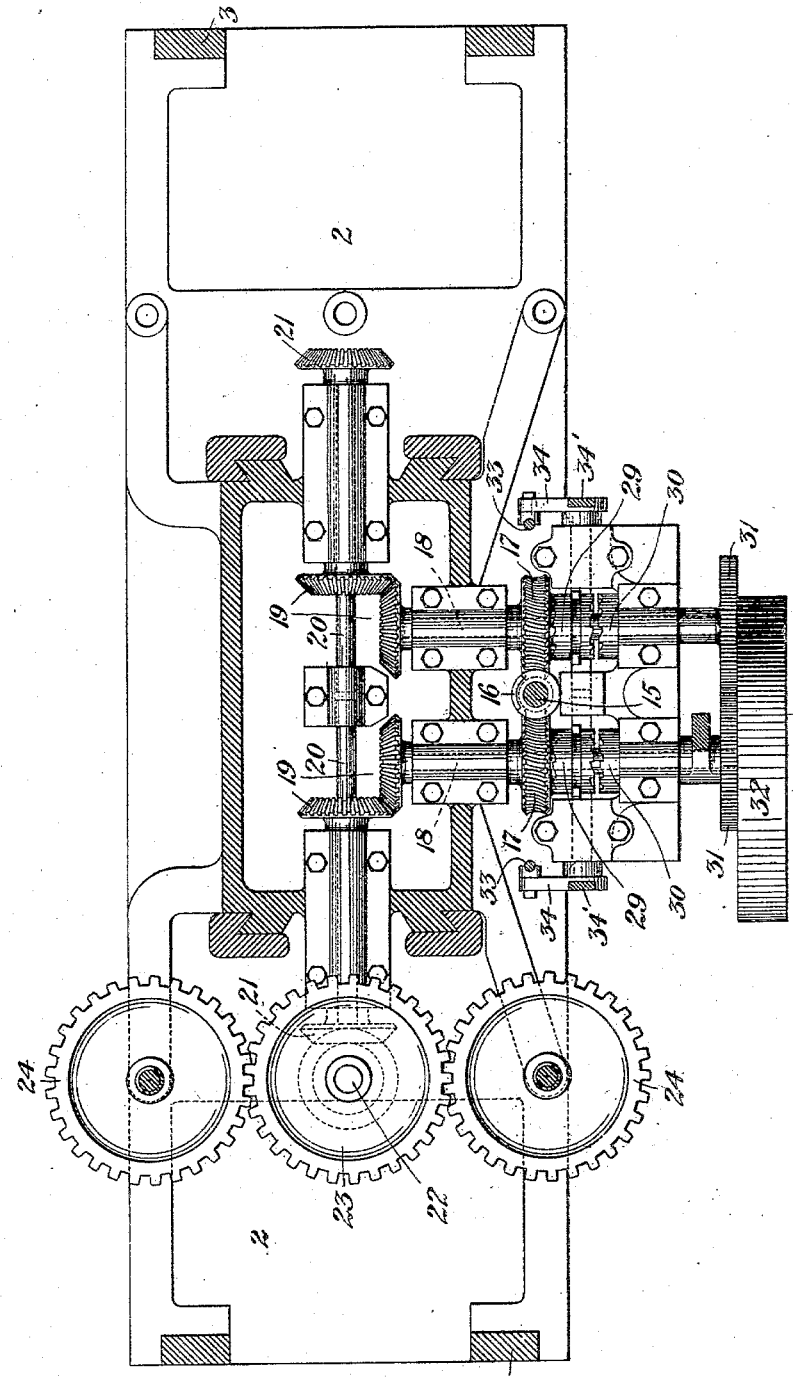
Figure 10:
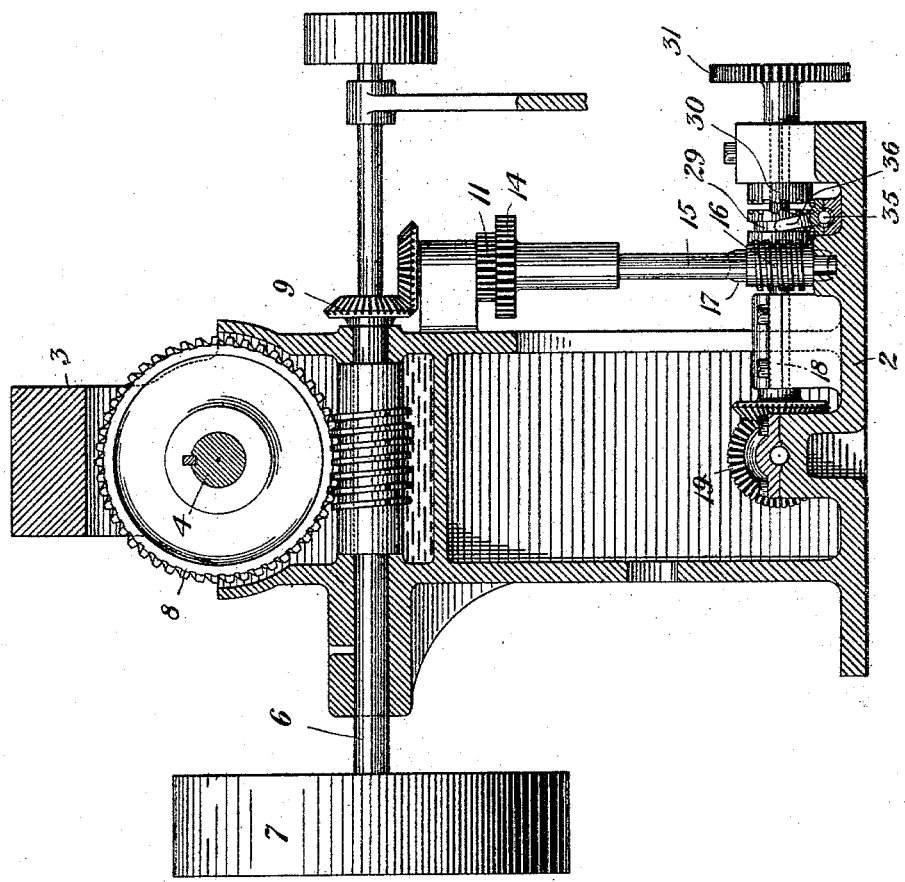
Figure 11:
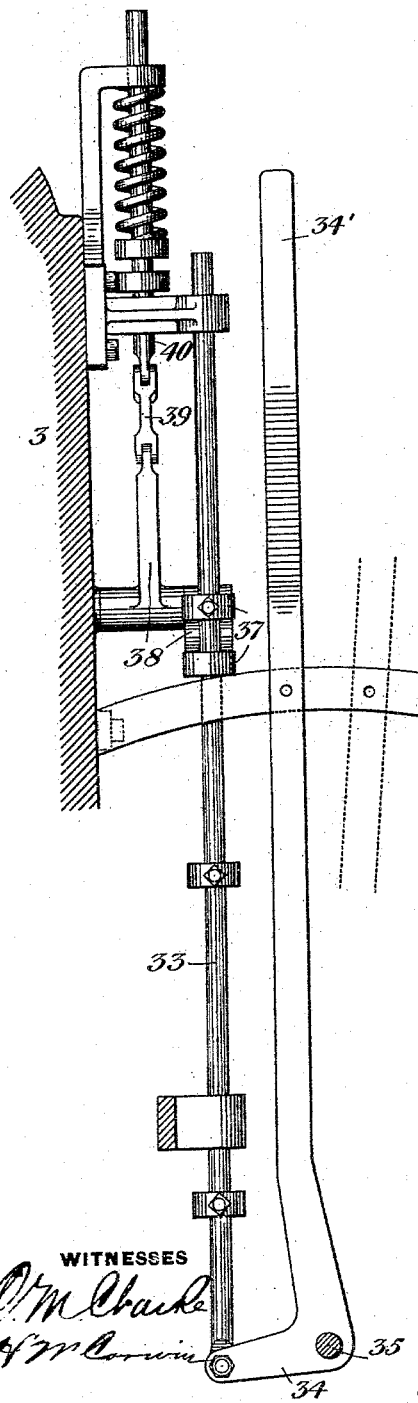
Figure 12:
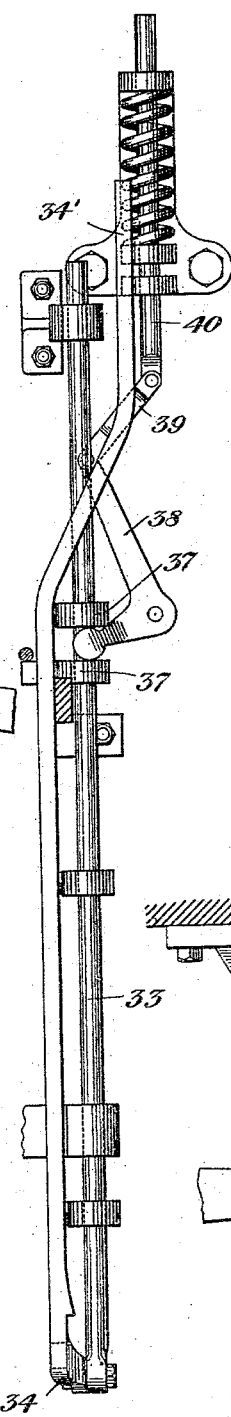
Figure 13:
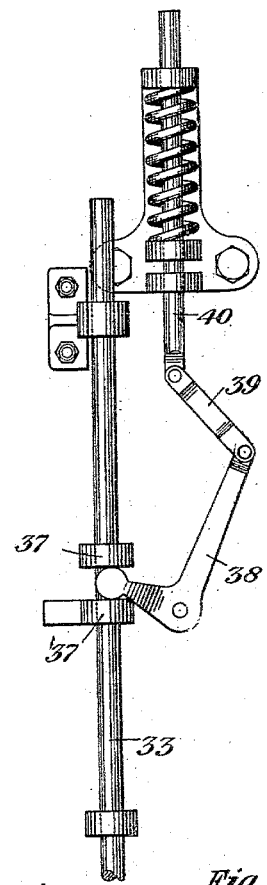
Figure 14:
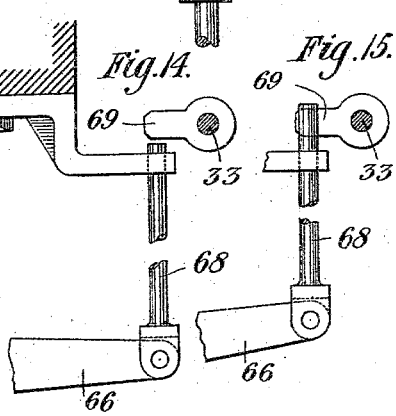
Figure 15:
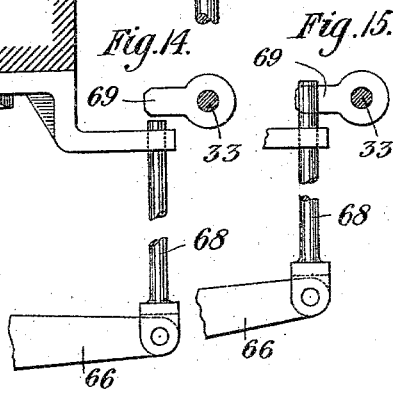
Figure 16:
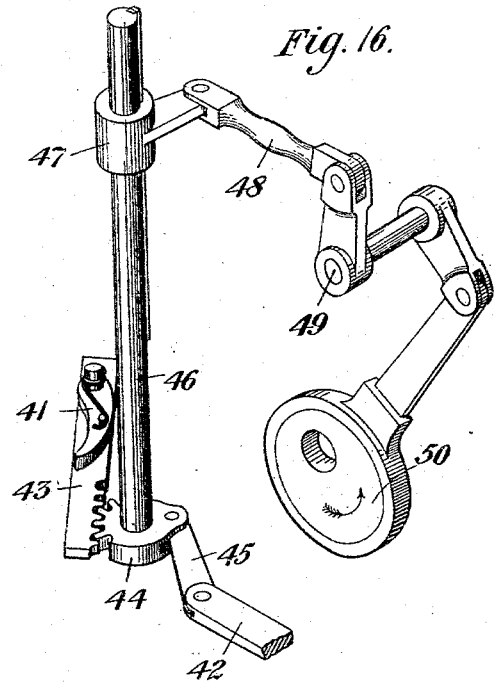
Figure 17:
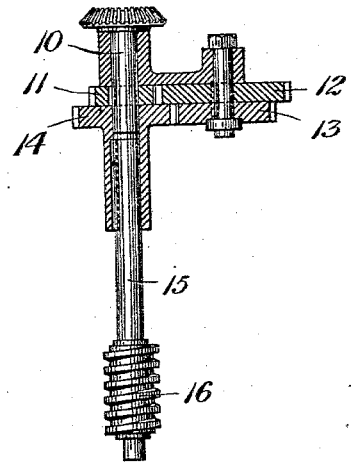
Figure 18:
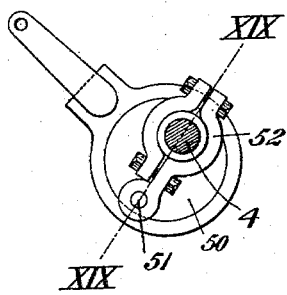
Figure 19:
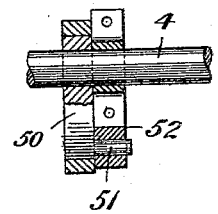

Figure 1 is a side elevation, partly in section, of my improved machine. Fig. 2 is a top plan view of the same, partly in horizontal section, on the line II II of Fig. 1. Fig. 3 is a horizontal section on the line III III of Fig. 1. Fig. 4 is a vertical section on the line IV IV of Fig. 1. Figs. 5 and 6 are detail views of the double-link motion for actuating the locking-tooth. Fig. 7 is a vertical section on the line VII VII of Fig. 1. Figs. 8 and 9 are details of the releasing mechanism. Fig. 10 is a vertical section on the line X X of Fig. 1. Figs. 11, 12, and 13 are detail views of the automatic mechanism for reversing the motion of the blanks. Figs. 14 and 15 are details of an automatic safety-stop in different positions. Fig. 16 is a perspective view of the intermittent rotating mechanism for turning the blanks. Fig. 17 is a cross-section of the slow-motion mechanism for moving the blanks upwardly past the cutters. Fig. 18 is a detail view of the friction-clutch for operating the eccentric of Fig. 16, and Fig. 19 is a cross-section of the friction-clutch and eccentric on the line XIX XIX of Fig. 18.

Like symbols of reference indicate like parts in each figure.

My invention relates to the class of gear-cutting machines, and is designed to provide a machine which will double or quadruple the usual product of such machines, with comparatively simple mechanism, and will turn out better gear-wheels in shorter time and with less power than formerly.

In the drawings, in which a machine for cutting four wheels simultaneously is shown, 2 is the bed-plate and 3 the frame supported thereon.

4 is a horizontal shaft to which are secured the revolving cutters 5, each of which cuts two teeth simultaneously, one upon each side, the wheel-blanks being moved upwardly relatively thereto during this operation.

6 is the main shaft of the machine, receiving motion from the pulley 7, and having thereon a worm which intermeshes with the worm-wheel 8 upon the cutter-shaft 4. Upon the shaft 6 is a bevel-wheel 9 intermeshing with a similar bevel-wheel upon a short vertical shaft 10, which, by the gear-wheels 11, 12, 13, and 14, communicates a slow motion to the lower shaft, 15, in line with the shaft 10, as shown in Fig. 17. The shaft 15, through the screw or worm 16 and the two worm-wheels 17, drives the two horizontal shafts 18, which, through bevel-gears 19, drive the shafts 20, which, by bevel-gears 21, actuate the two central vertical shafts 22. These shafts 22 are provided with pinions 23, which intermesh with pinions 24 upon the two screw-shafts 25, which enter the innerly screw-threaded tubular supports 26 for the blank-carrying tables 27. The two tables 27 at each end of the machine are preferably cast in one piece, with guide-plates, as shown in Figs. 1 and 7, and to each table is pivoted the revoluble disk 26, having the same number of teeth as are to be formed in the gear-wheel.

To reverse the motion of the tables and lower them quickly after the tooth has been cut by the upward movement of the tables, I provide the clutches 29, which, when the tooth is being formed, engage the collars to which the worm-wheels 17 are secured, but which may be thrown back to engage sleeves 30, having intermeshing pinions 31, and one of which is provided with the pulley 32 belted to the main shaft, as shown in Fig. 1. To automatically actuate these clutches I provide vertical rods 33, which are secured to the vertically-moving tables and are pivotally connected at their lower ends with bell-crank levers 34 secured to the shafts 35, which, as shown in Fig. 10, are provided with clutch-operating fingers 36. To insure the engagement of the clutch when moved by the rod I provide tappets 37 thereon, between which projects the end of a bell-crank 38, which connects by a link 39 with a vertical spring-actuated rod 40. By this means, when the link passes beyond the point at which it is in line with the arm of the bell-crank, a positive pressure or throw is exerted thereon by the spring which holds the jaws of the clutch firmly together until they engage. One arm of the bell-crank lever 34 is extended to form a handle 34', by which the clutch may be moved to an intermediate position, thus stopping all movement of the blank-tables.

To intermittently rotate the disks 28 to which the wheel-blanks are secured, I provide the spring-pressed pawls 41, which engage the teeth of the disks and are pivoted to sliding bars 42 and 43. These bars slide within guiding slots or grooves in the frame and are actuated by a disk 44, which is pivotally connected with the bar 42 by a link 45, and is provided with teeth engaging teeth in the bar 43. The disk 44 is secured to a vertical shaft 46, to which is splined a collar 47, to a projecting arm of which is pivoted a link 48 connecting it with a rock-shaft 49 operated by an eccentric 50 surrounding the shaft 4, as shown in Fig. 16. This eccentric is connected by a pin 51 with an adjustable clamp-collar 52, which frictionally engages the shaft 4 and is turned thereby whenever the blank-carrying disks are released and allowed to turn.

To stop the disks at the proper point and hold them in position, I provide locking-teeth 53, which are secured to slides 54 and engage the teeth of the blank-holding disks. The slides 54 are normally pressed inwardly by springs 55, Fig. 7, and are moved outwardly by levers 56 mounted upon shafts 57 operated by connecting-rods 58 from the short shaft 59 pivoted in the moving table. Secured to this shaft is a projecting lever-arm 60, which in the downward movement of the table engages a projecting pin 61 upon a vertically-pivoted lever 62 and thus turning the shaft 59 disengaging the locking-teeth. As soon as the shaft 57 is turned a projecting lug 63 upon the table engages an incline upon the lever and forces it back against the action of a spring 64, thus releasing the locking-teeth, which are driven inwardly by their springs and engage the next tooth in the revolution of the disks. To prevent the lever 60 dropping down, I provide the hook 65 upon the table, which engages its outer end.

To prevent the accidental moving upward of the tables, if they are not rotated correctly, or if the tooth 53 remains upon the outside of a tooth, I provide the locking-arm 66, which projects from a shaft 67 operated by the slide 54, and is provided with a pivoted rod 68, which, when the slide 54 is moved out, moves over a tappet 69 upon the rod 33 and holds the clutch in intermediate position, so that the wheel-blanks are not moved upwardly.

The advantages of my invention will be appreciated by those skilled in the art, since two teeth are cut simultaneously by a single cutter, and the apparatus is simple, compact and not liable to get out of order.

Modifications in the form, construction, and arrangement of the parts may be made by the skilled mechanic without departing from my invention; since

What I claim as my invention is—

1. In a gear-cutting machine, a rotary shaft having a cutter thereon, blank-carrying tables upon each side of the shaft, and means for moving said tables and cutter toward and from each other; substantially as described.

2. In a gear-cutting machine, a rotary shaft having a cutter thereon, blank-carrying tables upon each side of the shaft, and means for simultaneously moving said tables and cutter toward and from each other; substantially as described.

3. In a gear-cutting machine, a rotary cutter mounted in stationary bearings, a pivoted blank carrying table, means for moving said table past the cutter to cut a tooth in the blank, and means for automatically rotating the table a certain distance after each tooth is cut; substantially as described.

4. In a gear-cutting machine, a rotary cutter, a pivoted toothed blank-carrying disk, means for moving the disk toward the rotating cutter to cut a tooth in the blank, a tooth engaging the disk teeth, means for retracting said tooth, and means for rotating the disk; substantially as described.

5. In a gear-cutting machine, a rotary cutter, a pivoted toothed blank-carrying disk, means for moving the disk toward the rotating cutter to cut a tooth in the blank, a spring-pressed tooth engaging the disk teeth, means for retracting said tooth, and means for rotating the disk; substantially as described.

6. In a gear-cutting machine, a rotary cutter, a pivoted toothed blank-carrying disk, means for moving the disk toward the rotating cutter to cut a tooth in the blank, a tooth engaging the disk-teeth, means upon the table for retracting said tooth, and means for rotating the disk; substantially as described.

7. In a gear-cutting machine, a rotary cutter, a pivoted toothed blank-carrying disk, means for moving the disk toward the rotating cutter to cut a tooth in the blank, a tooth engaging the disk-teeth, means for retracting said tooth and releasing it as soon as it reaches the outer face of the disk, and means for rotating the disk; substantially as described.

8. In a gear-cutting machine, a rotary cutter, a pivoted toothed blank-carrying disk, means for moving the disk toward the rotating cutter to cut a tooth in the blank, a tooth engaging the disk-teeth, a lever pivoted to the table and arranged to retract said tooth, a projection against which the lever is arranged to strike, and means for rotating the disk; substantially as described.

9. In a gear-cutting machine, a rotary cutter, a pivoted toothed blank-carrying disk, means for moving the table past the cutter, a tooth engaging the disk-teeth, a lever pivoted to the table and arranged to retract the tooth, a bar pivoted to the frame and having a projection arranged to engage the lever, a projection upon the table arranged to force back the bar, and means for rotating the disk; substantially as described.

In testimony whereof I have hereunto set my hand.

AUGUST MERTES.

Witnesses:
F. E. GAITHER,
H. M. CORWIN.